(12) United States Patent
Niwa et al.

(10) Patent No.: US 10,360,936 B2
(45) Date of Patent: Jul. 23, 2019

(54) ASSISTED MAGNETIC RECORDING MEDIUM INCLUDING A PINNING LAYER AND MAGNETIC STORAGE DEVICE

(71) Applicant: SHOWA DENKO K.K., Tokyo (JP)

(72) Inventors: Kazuya Niwa, Ichihara (JP); Tetsuya Kanbe, Ichihara (JP); Yuji Murakami, Ichihara (JP); Lei Zhang, Ichihara (JP); Hisato Shibata, Ichihara (JP); Takayuki Fukushima, Ichihara (JP); Satoru Nakajima, Ichihara (JP); Takehiro Yamaguchi, Ichihara (JP)

(73) Assignee: SHOWA DENKO K.K., Minato-ku, Tokyo (JP)

( * ) Notice: Subject to any disclaimer, the term of this patent is extended or adjusted under 35 U.S.C. 154(b) by 0 days.

(21) Appl. No.: 15/885,013

(22) Filed: Jan. 31, 2018

(65) Prior Publication Data
US 2018/0261245 A1    Sep. 13, 2018

(30) Foreign Application Priority Data

Mar. 7, 2017   (JP) ................. 2017-042585

(51) Int. Cl.
| | | |
|---|---|---|
| *G11B 5/65* | (2006.01) | |
| *G11B 5/738* | (2006.01) | |
| *G11B 5/39* | (2006.01) | |
| *G11B 5/73* | (2006.01) | |
| *G11B 5/187* | (2006.01) | |
| *G11B 5/74* | (2006.01) | |
| *G11B 5/714* | (2006.01) | |

(Continued)

(52) U.S. Cl.
CPC .............. *G11B 5/656* (2013.01); *G11B 5/012* (2013.01); *G11B 5/1875* (2013.01); *G11B 5/3912* (2013.01); *G11B 5/714* (2013.01); *G11B 5/738* (2013.01); *G11B 5/7325* (2013.01); *G11B 5/746* (2013.01); *G11B 5/3133* (2013.01); *G11B 2005/0021* (2013.01)

(58) Field of Classification Search
CPC ........ G11B 5/3133; G11B 5/656; G11B 5/738
See application file for complete search history.

(56) References Cited

U.S. PATENT DOCUMENTS

| | | | |
|---|---|---|---|
| 6,068,739 A | 5/2000 | Suzuki et al. | |
| 8,043,733 B2* | 10/2011 | Lee ........................ | G11B 5/855 428/800 |

(Continued)

FOREIGN PATENT DOCUMENTS

| | | |
|---|---|---|
| CN | 101847417 A | 9/2010 |
| JP | 11-353648 A | 12/1999 |

(Continued)

*Primary Examiner* — Jefferson A Evans
(74) *Attorney, Agent, or Firm* — Sughrue Mion, PLLC

(57) ABSTRACT

The invention provides a magnetic recording medium with an excellent signal-to-noise ratio during reading by reducing the noise produced during writing of data onto the magnetic recording medium, and increasing the signal level. The assisted magnetic recording medium according to one embodiment comprising a substrate, a base layer, and a magnetic layer composed mainly of an alloy with an $L1_0$-type crystal structure, the assisted magnetic recording medium having a pinning layer in contact with the magnetic layer, and the pinning layer including Co or an alloy composed mainly of Co.

6 Claims, 2 Drawing Sheets

(51) Int. Cl.
 *G11B 5/012* (2006.01)
 *G11B 5/31* (2006.01)
 *G11B 5/00* (2006.01)

(56) References Cited

U.S. PATENT DOCUMENTS

| | | | |
|---|---|---|---|
| 8,345,374 B2* | 1/2013 | Sendur | B82Y 10/00 360/77.01 |
| 8,877,359 B2* | 11/2014 | Saito | G11B 5/65 428/828.1 |
| 9,013,832 B2* | 4/2015 | Sakawaki | G11B 5/66 360/135 |
| 2002/0058160 A1* | 5/2002 | Oikawa | G11B 5/66 428/832 |
| 2004/0150912 A1* | 8/2004 | Kawato | G11B 5/1278 360/125.13 |
| 2004/0224185 A1* | 11/2004 | Nakamura | G11B 5/667 428/836.2 |
| 2005/0202287 A1 | 9/2005 | Lu et al. | |
| 2007/0254189 A1 | 11/2007 | Nakagawa et al. | |
| 2008/0090104 A1 | 4/2008 | Sonobe et al. | |
| 2009/0161254 A1* | 6/2009 | Ishio | B82Y 10/00 360/110 |
| 2010/0159280 A1* | 6/2010 | Lai | G11B 5/65 428/800 |
| 2010/0247969 A1 | 9/2010 | Hauet et al. | |
| 2013/0314815 A1* | 11/2013 | Yuan | G11B 5/65 360/59 |
| 2014/0308542 A1* | 10/2014 | Zhang | G11B 5/7325 428/831.2 |
| 2015/0029830 A1 | 1/2015 | Zhang et al. | |
| 2015/0162042 A1* | 6/2015 | Kimura | G11B 5/656 428/832.2 |
| 2016/0118071 A1* | 4/2016 | Hirotsune | G11B 5/65 360/75 |
| 2016/0247531 A1* | 8/2016 | O'Grady | G11B 5/667 |
| 2018/0226092 A1* | 8/2018 | Fukushima | G11B 5/65 |

FOREIGN PATENT DOCUMENTS

| | | |
|---|---|---|
| JP | 2007-272950 A | 10/2007 |
| JP | 2008-084432 A | 4/2008 |
| JP | 2015-005326 A | 1/2015 |
| JP | 2015-026411 A | 2/2015 |

* cited by examiner

ASSISTED MAGNETIC RECORDING MEDIUM INCLUDING A PINNING LAYER AND MAGNETIC STORAGE DEVICE

TECHNICAL FIELD

The present invention relates to an assisted magnetic recording medium and a magnetic storage device.

BACKGROUND ART

Demand for greater storage capacity of hard disk devices has continued to increase in recent years.

However, it has been difficult to increase the recording density of hard disk devices using existing recording systems.

Assisted magnetic recording systems are a form of technology being actively researched and focused on as next-generation recording systems. Assisted magnetic recording systems are a type of recording system in which a magnetic recording medium is irradiated with near-field light or microwaves from a magnetic head, and the coercive force in the irradiated region is locally reduced to write magnetic data therein. A magnetic recording medium which is irradiated with near-field light is referred to as a "heat-assisted magnetic recording medium", and one which is irradiated with microwaves is referred to as a "microwave-assisted magnetic recording medium".

In an assisted magnetic recording system, the material of which the magnetic layer is composed is a high-Ku material, such as FePt with an $L1_0$-type crystal structure (Ku up to $7 \times 10^7$ erg/cm$^3$), or CoPt with an $L1_0$-type crystal structure (Ku up to $5 \times 10^7$ erg/cm$^3$).

Using a high Ku material for the material composing the magnetic layer results in an increased KuV/kT. Ku is the magnetic anisotropy constant of magnetic particles, V is the volume of magnetic particles, k is the Boltzmann constant and T is the temperature. It is thus possible to minimize demagnetization by thermal fluctuation, along with the reduced volume of magnetic particles. Micronization of the magnetic particles can narrow the transition width in a heat-assisted magnetic recording system, thereby making it possible to achieve reduction in noise and improvement in the signal-to-noise ratio (SNR).

PTL 1 describes a heat-assisted data recording medium having an $L1_0$ ordered alloy layer made of a FePt alloy formed on a base layer that is composed mainly of MgO.

PTL 2 describes a heat-assisted data recording medium having a magnetic layer with an HCP structure composed of a Co-based alloy formed on a magnetic layer with an $L1_0$ structure composed of an FePt alloy, for the purpose of introducing exchange coupling between the magnetic particles of the magnetic layer with an $L1_0$ structure composed of an FePt alloy.

CITATION LIST

Patent Literature

[PTL 1] Japanese Unexamined Patent Publication HEI No. 11-353648
[PTL 2] Japanese Unexamined Patent Publication No. 2015-005326

SUMMARY OF INVENTION

Problems to be Solved by the Invention

In an assisted magnetic recording medium, the coercive force of the magnetic recording medium is locally reduced by using laser light or microwaves irradiated from a magnetic head, thereby writing magnetic data on the magnetic layer. Investigation by the present inventors has shown that during recovery of coercive force immediately after writing on a magnetic layer, magnetic reversal occurs at the periphery of the writing bit and at some of the numerous magnetic particles composing the bit, and that these magnetic reversed regions cause noise during reading of the magnetic recording medium.

It is an object of the present invention to solve this problem and to provide a magnetic recording medium with an excellent signal-to-noise ratio when reading, by reducing the noise caused during writing of data onto the magnetic recording medium, while increasing the signal level.

Means for Solving the Problems

The present invention includes embodiments according to the following items (1) to (7).

(1)
An assisted magnetic recording medium comprising a substrate, a base layer, and a magnetic layer composed mainly of an alloy with an $L1_0$-type crystal structure, the assisted magnetic recording medium having a pinning layer in contact with the magnetic layer, and the pinning layer including Co or an alloy composed mainly of Co.

(2)
The assisted magnetic recording medium according to (1), wherein the pinning layer pins the magnetization direction of the magnetic particles when magnetic data has been written on the magnetic layer.

(3)
The assisted magnetic recording medium according to (1) or (2), wherein the difference ($P_{Tc}-M_{Tc}$) between the Curie temperature of the magnetic material composing the pinning layer ($P_{Tc}$) and the Curie temperature of the magnetic material composing the magnetic layer ($M_{Tc}$) is 200K or greater.

(4)
The assisted magnetic recording medium according to any one of (1) to (3), wherein the pinning layer has a granular structure comprising Co or an alloy composed mainly of Co, and at least one oxide selected from the group consisting of $SiO_2$, $Cr_2O_3$, $TiO_2$, $B_2O_3$, $GeO_2$, MgO, $Ta_2O_5$, CoO, $Co_3O_4$, FeO, $Fe_2O_3$ and $Fe_3O_4$.

(5)
The assisted magnetic recording medium according to any one of (1) to (4), wherein the layer thickness of the pinning layer is from 0.5 nm to 5 nm.

(6)
The assisted magnetic recording medium according to any one of (1) to (5), which has the pinning layer on the side of the magnetic layer opposite from the substrate side.

(7)
A magnetic storage device comprising an assisted magnetic recording medium according to any one of (1) to (6), a magnetic recording medium driving unit for rotating the assisted magnetic recording medium, a magnetic head that carries out recording and reproduction operations on the assisted magnetic recording medium, a magnetic head driving unit for moving the magnetic head, and a recording/reproduction signal processing system.

Effect of the Invention

According to the invention, noise produced during writing of data onto a magnetic recording medium is reduced, thereby allowing the signal level to be increased. It is thereby possible to provide a magnetic storage device with a high SNR during reading, and high recording density.

DESCRIPTION OF EMBODIMENTS

Embodiments for carrying out the invention will now be described, with the understanding that the invention is not limited to these embodiments, and various modifications and substitutions to the embodiments may be added within the scope of the invention.

Figure 1:
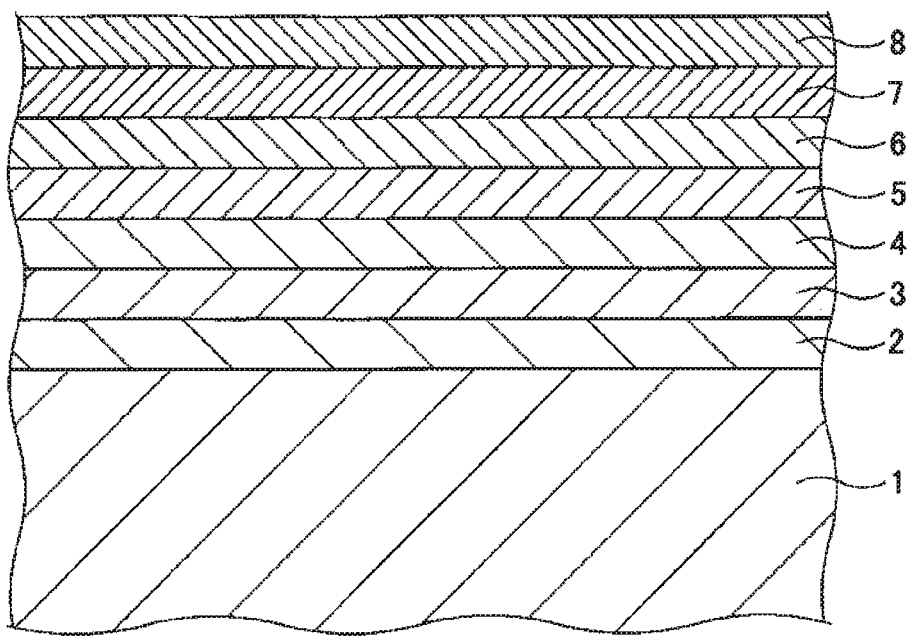
FIG. 1 is a schematic diagram showing an assisted magnetic recording medium according to one embodiment of the invention.

FIG. 1 shows an assisted magnetic recording medium according to one embodiment.

Assisted magnetic recording medium 100 of the embodiment shown in FIG. 1 has a structure comprising seed layer 2, first base layer 3, second base layer 4, magnetic layer 5 having a (001)-oriented alloy with an $L1_0$-type crystal structure, pinning layer 6, carbon protective layer 7 and lubricating film 8, formed in that order on substrate 1.

Pinning layer 6 is a layer of a magnetic material comprising Co or an alloy composed mainly of Co, and it is provided in contact with magnetic layer 5. Pinning layer 6 pins the magnetization direction of the magnetic particles, when magnetic data has been written on magnetic layer 5.

In an assisted magnetic recording medium, the coercive force of the magnetic recording medium is locally reduced by using laser light or microwaves irradiated from a magnetic head, thereby writing magnetic data on the magnetic layer. As mentioned above, the inventors have found that during recovery of coercive force immediately after writing, magnetic reversal occurs at the periphery of the writing bit and at some of the numerous magnetic particles composing the bit, and these magnetic reversed regions cause noise during reading of the magnetic recording medium. The phenomenon is thought to be due to fluctuation generated in the magnetization direction during recovery of coercive force (heat fluctuation in a heat-assisted medium) in the particles with particularly small particle sizes included among the magnetic particles having an $L1_0$-type crystal structure, resulting in re-reversal of the magnetization direction in some of the magnetic particles.

The inventors have found that by providing a pinning layer in contact with the magnetic layer, the pinning layer formed of a magnetic material made of Co or composed mainly of Co that has a high Curie temperature, it is possible to prevent such magnetic reversal of magnetic particles by pinning with the pinning layer. This allows a magnetic recording medium to be obtained with excellent noise characteristics.

According to one embodiment, the difference $(P_{Tc}-M_{Tc})$ between the Curie temperature of the magnetic material composing the pinning layer $(P_{Tc})$ and the Curie temperature of the magnetic material composing the magnetic layer $(M_{Tc})$ is preferably 200K or greater, more preferably 300K or greater and most preferably 500K or greater. The optimum value of $(P_{Tc}-M_{Tc})$ depends on the constituent material and layer thickness of the pinning layer, the constituent material and layer thickness of the magnetic layer, and the particle size distribution of magnetic particles composing the magnetic layer. When $(P_{Tc}-M_{Tc})$ is 200K or greater, the pinning layer is able to more effectively pin magnetic reversal of the magnetic particles.

Known Curie temperatures for typical magnetic materials are 1388K for Co, 1044K for Fe, 624K for Ni, approximately 750K for FePt, approximately 1000K for $SmCo_5$, and approximately 400K to 600K for CoCrPt-based magnetic alloys. The alloy composition of the pinning layer and the Curie temperatures may be determined based on these values. Since Co has the highest Curie temperature among practical magnetic materials, $P_{Tc}$ and $(P_{Tc}-M_{Tc})$ are maximum when using pure Co (Co element). According to the invention, a larger $(P_{Tc}-M_{Tc})$ can ensure an effect of pinning magnetic reversal of magnetic particles by the pinning layer, and therefore the pinning layer preferably includes pure Co as the magnetic material.

According to one embodiment, the value of $(P_{Tc}-M_{Tc})$ can be adjusted to within the preferred range by appropriately selecting Co or a magnetic alloy composed mainly of Co, which has a high Curie temperature, as the pinning layer. Magnetic materials that may be suitably used in the pinning layer include pure Co, CoPt, CoB, CoSi, CoC, CoNi, CoFe, CoPtB, CoPtSi, CoPtC, CoGe, CoBN (non-granular structure) and $CoSi_3N_4$ (non-granular structure). In addition to these, there may be mentioned materials having elements added that are included in the magnetic layer in contact with the pinning layer, or elements with minimal effects even when diffused in the magnetic layer.

The content of alloy elements other than Co, such as Pt, B, Si, C, Ni, Fe, Ge and N, is preferably no greater than 15 at % and more preferably no greater than 10 at %, based on the total of all alloy elements including Co. When the content of alloy elements other than Co is within the above range, a pinning effect can be obtained without significant lowering of the saturation magnetization and/or Curie temperature of Co as the main component.

Since the purpose of the pinning layer is to pin magnetic reversal of the magnetic particles composing the magnetic layer, as mentioned above, it is believed that a non-granular structure is advantageous for the magnetic particles composing the pinning layer. Based on investigation by the present inventors, however, providing a pinning layer with a non-granular structure on the magnetic layer can sometimes cause exchange coupling between the magnetic particles composing the magnetic layer via the pinning layer, thereby producing noise, depending on the film-forming conditions of the pinning layer.

When this problem arises, it is preferred for the pinning layer to have a granular structure, and it is most preferred for the magnetic particles composing the magnetic layer and the magnetic particles composing the pinning layer to be columnar crystals with the crystal grains connected in the thickness direction. Such embodiments allow exchange coupling between the magnetic particles composing the pinning layer to be blocked, and exchange coupling via the pinning layer between the magnetic particles composing the magnetic layer to also be blocked. Generation of noise during writing of data can thus be effectively reduced.

The pinning layer preferably has a granular structure comprising Co or an alloy composed mainly of Co; and at least one second component selected from the group consisting of oxides, nitrides, carbides and carbon (C), wherein the oxide is at least one selected from the group consisting of $SiO_2$, $Cr_2O_3$, $TiO_2$, $B_2O_3$, $GeO_2$, MgO, $Ta_2O_5$, CoO, $Co_3O_4$, FeO, $Fe_2O_3$ and $Fe_3O_4$, the nitride is at least one selected from the group consisting of BN, $Si_3N_4$, $SiO_xN_y$ (x>0 and y>0), TiN, ZrN, AlN, TaN, $Ta_2N$, CrN, $Cr_2N$, GaN and $Mg_3N_2$, and the carbide is at least one selected from the group consisting of TiC, SiC, ZrC, $B_4C$, WC, VC, $Al_4C_3$, HfC, $Mo_2C$, NbC and TaC. More preferably, the pinning layer has a granular structure comprising Co or an alloy composed mainly of Co, and at least one oxide selected from the group consisting of $SiO_2$, $Cr_2O_3$, $TiO_2$, $B_2O_3$, $GeO_2$, MgO, $Ta_2O_5$, CoO, $Co_3O_4$, FeO, $Fe_2O_3$ and $Fe_3O_4$. Particularly preferred are structures employing at least one oxide of the aforementioned oxides, selected from the group consisting of CoO, $Co_3O_4$, FeO, $Fe_2O_3$ and $Fe_3O_4$. When the substrate is brought to high temperature during formation of the pinning layer in the process of manufacturing an assisted medium, these oxides are resistant to thermal decomposition and are less likely to diffuse among the magnetic particles and into other layers. Even when such oxides have diffused among the magnetic particles or into other layers, their adverse effect on the magnetic properties of the magnetic layer and pinning layer is minimal.

The oxide content is preferably 10 vol % to 50 vol % and more preferably 15 vol % to 45 vol %, based on the total of Co or the alloy composed mainly of Co, and the oxides. Such a range allows a pinning effect to be satisfactorily obtained while forming a granular structure.

The layer thickness of the pinning layer is preferably from 0.5 nm to 5 nm. The optimal layer thickness for the pinning layer depends on the value of ($P_{Tc}$–$M_{Tc}$), the constituent material of the pinning layer, the constituent material and layer thickness of the magnetic layer, and the particle size distribution of magnetic particles composing the magnetic layer. When the layer thickness of the pinning layer is 0.5 nm or greater, a greater pinning effect can be obtained. When the layer thickness of the pinning layer is 5 nm or smaller, noise from the pinning layer can be reduced. The preferred upper limit for the pinning layer thickness depends on the constituent material of the pinning layer. For pure Co, the upper limit is most preferably 3 nm, and for Co alloys, the upper limit is most preferably 5 nm.

The pinning layer is preferably provided on the side of the magnetic layer opposite the substrate side. A pinning layer formed of Co or an alloy composed mainly of Co as described above may adopt a crystal structure other than an $L1_0$ structure, such as an hcp structure. By providing the pinning layer on the side of the magnetic layer opposite the substrate side, disordering of the (001)-oriented $L1_0$-type crystal structure in the magnetic layer can be prevented or reduced.

Assisted magnetic recording medium 100 of the embodiment shown in FIG. 1 has a monolayer seed layer and a base layer with a two-layer structure, i.e., seed layer 2, first base layer 3 and second base layer 4 formed in that order from substrate 1. These three layers are preferably lattice matched with magnetic layer 5 having an $L1_0$-type crystal structure and formed thereon. By thus forming a multilayer structure comprising a seed layer and base layers, the (001) orientation of the alloy with an $L1_0$-type crystal structure in magnetic layer 5 can be further increased.

Examples for the seed layer and base layer include, for example, (100)-oriented Cr, W and MgO.

The rate of lattice misfits between the seed layer and base layer, and between each of the base layers, are preferably no greater than 10%. A seed layer and base layer that can exhibit a lattice misfit rate of 10% or less may be a multilayer structure of (100)-oriented Cr, W or MgO as mentioned above, for example. In order to ensure that the base layers are (100)-oriented, Cr or an alloy with a bcc structure composed mainly of Cr, or an alloy with a B2 structure, may be used under the seed layer or base layer. Alloys with a bcc structure composed mainly of Cr include CrMn, CrMo, CrW, CrV, CrTi and CrRu. Examples of alloys with a B2 structure include RuAl and NiAl.

In order to increase lattice matching with magnetic layer 5, an oxide may be added to either or both the seed layer and the base layers.

As oxides there are preferred oxides of one or more elements selected from the group consisting of Cr, Mo, Nb, Ta, V and W. Particularly preferred oxides include CrO, $Cr_2O_3$, $CrO_3$, $MoO_2$, $MoO_3$, $Nb_2O_5$, $Ta_2O_5$, $V_2O_3$, $VO_2$, $WO_2$, $WO_3$ and $WO_6$.

The oxide content is preferably in the range of 2 mol % to 30 mol % and most preferably in the range of 10 mol % to 25 mol %. When the oxide content is 30 mol % or less, the desired degree of (100) orientation of the base layer can be maintained. When the oxide content is 2 mol % or greater, an effect of increasing the (001) orientation of magnetic layer 5 can be satisfactorily obtained.

Magnetic layer 5 in which the alloy with an $L1_0$-type crystal structure is (001)-oriented is composed of an alloy with a high magnetic anisotropy constant Ku. Examples of such alloys include FePt alloys and CoPt alloys.

Magnetic layer 5 is preferably heat treated during film formation in order to promote ordering in the alloy with an $L1_0$-type crystal structure. For a lower heating temperature (ordering temperature), Ag, Au, Cu, Ni or the like may be added to the alloy with an $L1_0$-type crystal structure.

The crystal grains of the alloy with an $L1_0$-type crystal structure in the magnetic layer 5 are preferably magnetically isolated. For this purpose, the magnetic layer 5 preferably further contains one or more added substances selected from the group consisting of $SiO_2$, $TiO_2$, $Cr_2O_3$, $Al_2O_3$, $Ta_2O_5$, $ZrO_2$, $Y_2O_3$, $CeO_2$, $GeO_2$, MnO, TiO, ZnO, $B_2O_3$, C, B and BN. This allows exchange coupling between the crystal grains to be more reliably decoupled and the SNR of assisted magnetic recording medium 100 to be further increased.

The mean particle size of the magnetic particles in magnetic layer 5 is not particularly limited. From the viewpoint of increased recording density, the mean particle size of the magnetic particles is preferably small, such as no greater than 10 nm, although magnetic particles having a smaller volume are more susceptible to thermal fluctuation immediately after writing. Nevertheless, providing the pinning layer of the invention in contact with the magnetic layer allows the magnetization direction to be pinned and can reduce noise arising from re-reversal immediately after writing, even in a magnetic recording medium made of magnetic particles with a small mean particle size, thereby increasing the SNR during reproduction. The mean particle size of the magnetic particles can be determined by using a planar TEM image. For example, the particle size (circle equivalent diameter) of 200 particles may be measured from a TEM image, and the particle size at 50% in the cumulative distribution may be taken as the mean particle size. The mean grain boundary width is preferably from 0.3 nm to 2.0 nm.

Magnetic layer 5 may have a multilayer structure. According to one embodiment, magnetic layer 5 has a multilayer structure of two or more layers, with one or more different added substances selected from the group consisting of $SiO_2$, $TiO_2$, $Cr_2O_3$, $Al_2O_3$, $Ta_2O_5$, $ZrO_2$, $Y_2O_3$, $CeO_2$, $GeO_2$, MnO, TiO, ZnO, $B_2O_3$, C, B and BN, in each respective layer.

The thickness of the magnetic layer is not particularly limited, but is preferably from 1 nm to 20 nm, and more preferably from 3 nm to 15 nm. When the magnetic layer thickness is 1 nm or greater, sufficient reproduction output can be obtained. When the magnetic layer thickness is 20 nm or smaller, enlargement of the crystal grains can be minimized. When the magnetic layer has a multilayer structure, the "magnetic layer thickness" is the total thickness of all of the layers.

In magnetic recording medium 100 according to one embodiment, carbon protective layer 7 is formed on pinning layer 6.

A method of forming carbon protective layer 7 is not particularly limited. Carbon protective layer 7 can be formed, for example, by RF-CVD (Radio Frequency-Chemical Vapor Deposition) in which a film is formed by decomposing hydrocarbon source gas with high-frequency plasma, by IBD (Ion Beam Deposition) in which a film is formed by ionizing a source gas with electrons emitted from a filament, or by FCVA (Filtered Cathodic Vacuum Arc) in which a film is formed using a solid C target, without a source gas.

The layer thickness of carbon protective layer 7 is not particularly limited, but is preferably in the range of 1 nm to 6 nm, for example. When the layer thickness is 1 nm or greater, degradation of the flying characteristics of the magnetic head can be reduced. When the layer thickness is 6 nm or smaller, increase in magnetic spacing loss can be reduced and reduction in the SNR of the magnetic recording medium can be reduced or prevented.

Lubricating film 8 may also be formed on carbon protective layer 7, by using a lubricating film composition comprising a perfluoropolyether-based fluorine resin.

(Magnetic Storage Device)

A construction example of a magnetic storage device will now be described.

The magnetic storage device according to one embodiment comprises an assisted magnetic recording medium according to one embodiment.

The magnetic storage device has a construction comprising an assisted magnetic recording medium driving unit for rotating the assisted magnetic recording medium, and a magnetic head comprising a near-field light generating element on the tip section. The magnetic storage device may further comprise a laser generator for heating the assisted magnetic recording medium, a waveguide that guides laser light generated from the laser generator to the near-field light generating element, a magnetic head driving unit for moving the magnetic head, and a recording/reproduction signal processing system.

Figure 2:
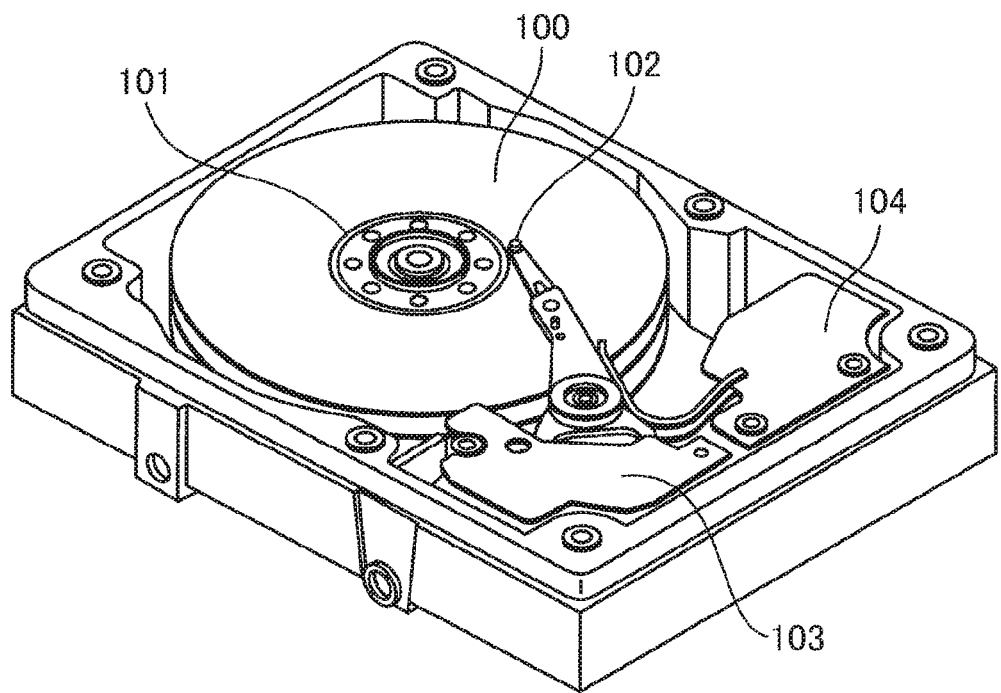
FIG. 2 is a schematic diagram showing a magnetic storage device according to one embodiment of the invention.

FIG. 2 shows a magnetic storage device according to one embodiment. The magnetic storage device in FIG. 2 comprises assisted magnetic recording medium 100, assisted magnetic recording medium driving unit 101 for rotating assisted magnetic recording medium 100, magnetic head 102, magnetic head driving unit 103 for moving the magnetic head, and recording/reproduction signal processing system 104.

Figure 3:
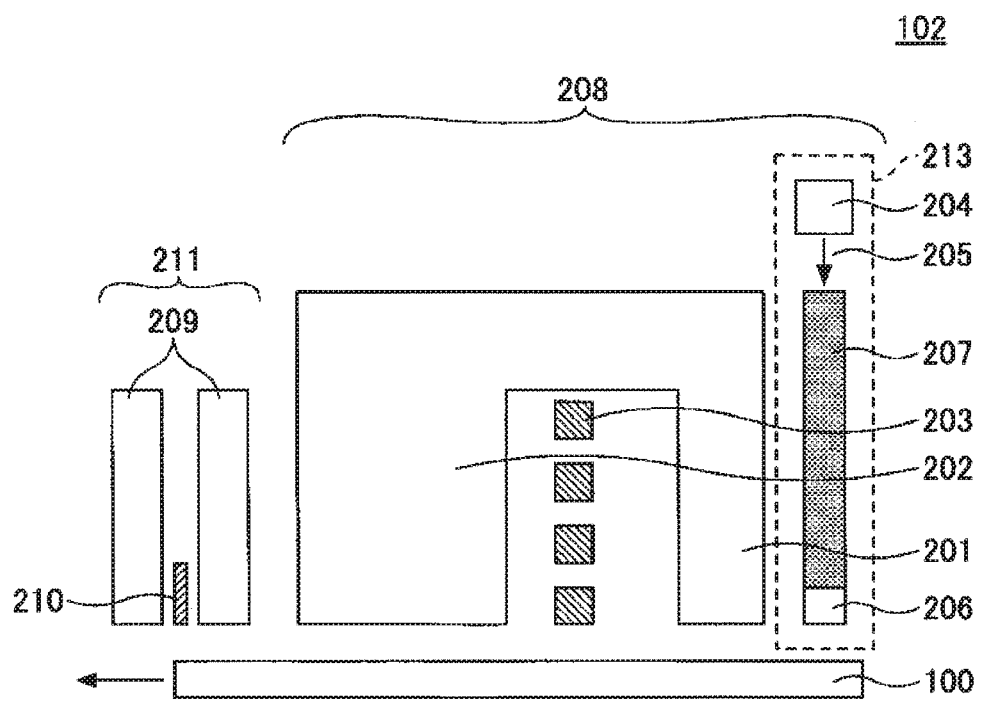
FIG. 3 is a schematic diagram showing an example of the magnetic head of the magnetic storage device of FIG. 2.

FIG. 3 shows an example of magnetic head 102 for a heat-assisted magnetic recording medium. Magnetic head 102 comprises recording head 208 and reproducing head 211. Recording head 208 has main pole 201, auxiliary pole 202, coil 203 for generating a magnetic field, laser diode (LD) 204 serving as a laser generator, and waveguide 207 for transmitting laser light 205 generated from the LD to near-field light generating element 206. Reproducing head 211 has reproducing element 210 inserted between shields 209.

A magnetic head for a microwave-assisted magnetic recording medium has a microwave generator or the like, which replaces laser diode (LD) 204 as a laser generator of magnetic head 102 for the heat-assisted magnetic recording medium, and therefore its explanation will be omitted.

Since the magnetic storage device shown in FIG. 2 employs assisted magnetic recording medium 100, noise arising during writing of data onto the magnetic recording medium can be reduced, and the SNR during reading can increase. A magnetic storage device with high recording density can thus be provided.

EXAMPLES

Concrete examples will be described, with the understanding that the invention is not limited to these examples.

Example 1

Assisted magnetic recording medium 100 was fabricated (see FIG. 1). The production steps for assisted magnetic recording medium 100 will now be explained.

After forming a 50 nm-thick 50 at % Cr-50 at % Ti film on glass substrate 1 having an outer diameter of 2.5-inch and heating the substrate to 350° C., a 15 nm-thick Cr film was formed as seed layer 2, a 30 nm-thick W film was formed thereon as first base layer 3 and a 3 nm-thick MgO film was further formed thereon as second base layer 4. Next, the substrate temperature was raised to 650° C., and a 2 nm-thick (50 at % Fe-50 at % Pt)-40 mol % C film and a 4.5 nm-thick (50 at % Fe-50 at % Pt)-15 mol % $SiO_2$ film were formed in that order as magnetic layer 5. On magnetic layer 5 there was formed a 1.2 nm-thick Co-9.5 mol % $SiO_2$ film, as listed in Table 1, as pinning layer 6. Then, 4 nm-thick carbon protective layer 7 was formed, and coated with lubricating film 8 having a thickness of 1.5 nm to produce magnetic recording medium 100.

(Evaluation)

Magnetic head 102 (see FIG. 3) was used for recording an all-one pattern signal with a linear recording density of 1500 kFCI on an assisted magnetic recording medium, and the noise and SNR were measured. The power introduced to the laser diode was adjusted to obtain a value of 60 nm for the track width MWW, which is defined as the half-width of the track profile. The pinning effect was evaluated as A, B or C, based on the value of $(P_{Tc}-M_{Tc})$. A indicates that a particularly desirable pinning effect was obtained, B indicates that a practical level of a pinning effect was obtained, and C indicates that a sufficient pinning effect was not obtained. The evaluation results are shown in Table 1.

Examples 2 to 24, Comparative Examples 1 to 9

Assisted magnetic recording media were produced in the same manner as Example 1, except for changing the production conditions as shown in Table 1. The numerical values before the elements composing the alloys in the pinning layer represent at %, and the numerical values before the oxides represent mol %. The evaluation results are shown in Table 1.

Comparative Example 1 had no pinning layer or exchange coupled layer on the magnetic layer and therefore had apparent reduction in noise, but the signal was also reduced and the SNR was greatly reduced. The magnetic material in the pinning layers of Comparative Examples 2 and 3 contained pure Fe which has a Curie temperature of nearly 1000K, and the $(P_{Tc}-M_{Tc})$ value was relatively large, 300K.

However, since the magnetic anisotropy constant (Ku) of Fe is smaller than the magnetic anisotropy constant of Co, the saturation magnetization (Ms) at high temperature is also lower than Co. As a result, the pinning effect is small and noise is high.

204 Laser diode
205 Laser light
206 Near-field light generating element
207 Waveguide
208 Recording head

TABLE 1

| | Magnetic layer | | | Pinning layer | | | | | |
|---|---|---|---|---|---|---|---|---|---|
| | Material | Film thickness (nm) | $M_{Tc}$ (K) | Material | Film thickness (nm) | $P_{Tc}$ (K) | $P_{Tc} - M_{Tc}$ (K) | Pinning effect | Noise (mV) | SNR (dB) |
| Example 1 | 85(50Fe—50Pt)—15SiO$_2$ | 4.5 | 700 | 90.5Co—9.5SiO$_2$ | 1.2 | 1300 | 600 | A | 0.093 | 10.9 |
| Example 2 | 85(50Fe—50Pt)—15SiO$_2$ | 4.5 | 700 | 91Co—9Cr$_2$O$_3$ | 1.2 | 1300 | 600 | A | 0.094 | 10.7 |
| Example 3 | 85(50Fe—50Pt)—15SiO$_2$ | 4.5 | 700 | 87Co—13TiO$_2$ | 1.2 | 1300 | 600 | A | 0.094 | 10.7 |
| Example 4 | 85(50Fe—50Pt)—15SiO$_2$ | 4.5 | 700 | 93Co—7B$_2$O$_3$ | 1.2 | 1300 | 600 | A | 0.093 | 10.9 |
| Example 5 | 85(50Fe—50Pt)—15SiO$_2$ | 4.5 | 700 | 86Co—14GeO$_2$ | 1.2 | 1300 | 600 | A | 0.093 | 10.8 |
| Example 6 | 85(50Fe—50Pt)—15SiO$_2$ | 4.5 | 700 | 80Co—20 MgO | 1.2 | 1300 | 600 | A | 0.093 | 10.9 |
| Example 7 | 85(50Fe—50Pt)—15SiO$_2$ | 4.5 | 700 | 95Co—5Ta$_2$O$_5$ | 1.2 | 1300 | 600 | A | 0.094 | 10.7 |
| Example 8 | 85(50Fe—50Pt)—15SiO$_2$ | 4.5 | 700 | 80Co—20CoO | 1.2 | 1300 | 600 | A | 0.093 | 11.2 |
| Example 9 | 85(50Fe—50Pt)—15SiO$_2$ | 4.5 | 700 | 93.5Co—6.5Co$_3$O$_4$ | 1.2 | 1300 | 600 | A | 0.093 | 11.1 |
| Example 10 | 85(50Fe—50Pt)—15SiO$_2$ | 4.5 | 700 | 82Co—18FeO | 1.2 | 1300 | 600 | A | 0.093 | 11.1 |
| Example 11 | 85(50Fe—50Pt)—15SiO$_2$ | 4.5 | 700 | 94Co—6Fe$_3$O$_4$ | 1.2 | 1300 | 600 | A | 0.093 | 11.1 |
| Example 12 | 85(50Fe—50Pt)—15SiO$_2$ | 4.5 | 700 | 91.5Co—8.5Fe$_2$O$_3$ | 1.2 | 1300 | 600 | A | 0.093 | 11.0 |
| Example 13 | 85(50Fe—50Pt)—15SiO$_2$ | 4.5 | 700 | 92.5(95Co—5Pt)—7.5SiO$_2$ | 1.2 | 1000 | 300 | B | 0.093 | 10.8 |
| Example 14 | 85(50Fe—50Pt)—15SiO$_2$ | 4.5 | 700 | 92.5(90Co—10B)—7.5SiO$_2$ | 1.2 | 1000 | 300 | B | 0.094 | 10.7 |
| Example 15 | 85(50Fe—50Pt)—15SiO$_2$ | 4.5 | 700 | 95(90Co—10C)—5SiO$_2$ | 1.2 | 1000 | 300 | B | 0.093 | 10.9 |
| Example 16 | 85(50Fe—50Pt)—15SiO$_2$ | 4.5 | 700 | 92.5(95Co—5Si)—7.5SiO$_2$ | 1.2 | 1000 | 300 | B | 0.093 | 10.8 |
| Example 17 | 85(50Fe—50Pt)—15SiO$_2$ | 4.5 | 700 | 92.5(95Co—5Ge)—7.5SiO$_2$ | 1.2 | 1000 | 300 | B | 0.093 | 10.8 |
| Example 18 | 85(50Fe—50Pt)—15SiO$_2$ | 4.5 | 700 | Co | 1.2 | 1300 | 600 | A | 0.096 | 9.7 |
| Example 19 | 85(50Fe—50Pt)—15SiO$_2$ | 4.5 | 700 | 80Co—20CoO | 0.4 | 1300 | 600 | A | 0.092 | 10.4 |
| Example 20 | 85(50Fe—50Pt)—15SiO$_2$ | 4.5 | 700 | 80Co—20CoO | 0.5 | 1300 | 600 | A | 0.092 | 10.6 |
| Example 21 | 85(50Fe—50Pt)—15SiO$_2$ | 4.5 | 700 | 80Co—20CoO | 1.0 | 1300 | 600 | A | 0.093 | 11.2 |
| Example 22 | 85(50Fe—50Pt)—15SiO$_2$ | 4.5 | 700 | 80Co—20CoO | 1.5 | 1300 | 600 | A | 0.093 | 11.2 |
| Example 23 | 85(50Fe—50Pt)—15SiO$_2$ | 4.5 | 700 | 80Co—20CoO | 2.0 | 1300 | 600 | A | 0.093 | 10.9 |
| Example 24 | 85(50Fe—50Pt)—15SiO$_2$ | 4.5 | 700 | 80Co—20CoO | 3.0 | 1300 | 600 | A | 0.095 | 10.6 |
| Comp. Example 1 | 85(50Fe—50Pt)—15SiO$_2$ | 4.5 | 700 | — | — | — | — | — | 0.090 | 7.5 |
| Comp. Example 2 | 85(50Fe—50Pt)—15SiO$_2$ | 4.5 | 700 | Fe | 1.2 | 1000 | 300 | C | 0.110 | 7.8 |
| Comp. Example 3 | 85(50Fe—50Pt)—15SiO$_2$ | 4.5 | 700 | 80Fe—20CoO | 1.2 | 1000 | 300 | C | 0.110 | 7.8 |
| Comp. Example 4 | 85(50Fe—50Pt)—15SiO$_2$ | 4.5 | 700 | 69Co—8Cr—15Pt—8B | 1.2 | <700 | <0 | C | 0.101 | 8.0 |
| Comp. Example 5 | 85(50Fe—50Pt)—15SiO$_2$ | 4.5 | 700 | 90(69Co—8Cr—15Pt—8B)—10SiO$_2$ | 1.2 | <700 | <0 | C | 0.101 | 8.0 |
| Comp. Example 6 | 85(50Fe—50Pt)—15SiO$_2$ | 4.5 | 700 | 90(69Co—8Cr—15Pt—8B)—10TiO$_2$ | 1.2 | <700 | <0 | C | 0.101 | 8.0 |
| Comp. Example 7 | 85(50Fe—50Pt)—15SiO$_2$ | 4.5 | 700 | 90(75Co—8Cr—12Pt—5Ru)—10SiO$_2$ | 1.2 | <700 | <0 | C | 0.100 | 8.3 |
| Comp. Example 8 | 85(50Fe—50Pt)—15SiO$_2$ | 4.5 | 700 | 90(71Co—10Cr—15Pt—4C)—10SiO$_2$ | 1.2 | <700 | <0 | C | 0.100 | 8.0 |
| Comp. Example 9 | 85(50Fe—50Pt)—15SiO$_2$ | 4.5 | 700 | 76Co—12Zr—12B | 1.2 | <700 | <0 | C | 0.100 | 8.3 |

EXPLANATION OF SYMBOLS

1 Substrate
2 Seed layer
3 First base layer
4 Second base layer
5 Magnetic layer
6 Pinning layer
7 Carbon protective layer
8 Lubricating film
100 Assisted magnetic recording medium
101 Assisted magnetic recording medium driving unit
102 Magnetic head
103 Magnetic head driving unit
104 Recording/reproduction signal processing system
201 Main pole
202 Auxiliary pole
203 Coil
209 Shield
210 Reproducing element
211 Reproducing head
212 Heat-assisted magnetic recording medium

The invention claimed is:

1. An assisted magnetic recording medium comprising a substrate, a base layer, and a magnetic layer composed mainly of an alloy with an L1$_0$-type crystal structure, the assisted magnetic recording medium having a pinning layer in contact with the magnetic layer, and the pinning layer including Co or an alloy composed mainly of Co wherein the difference ($P_{Tc}$–$M_{Tc}$) between the Curie temperature of the magnetic material composing the pinning layer ($P_{Tc}$) and the Curie temperature of the magnetic material composing the magnetic layer ($M_{Tc}$) is 200K or greater.

2. The assisted magnetic recording medium according to claim 1, wherein the pinning layer pins the magnetization direction of the magnetic particles when magnetic data has been written on the magnetic layer.

3. The assisted magnetic recording medium according to claim 1, wherein the pinning layer has a granular structure comprising Co or an alloy composed mainly of Co, and at least one oxide selected from the group consisting of $SiO_2$, $Cr_2O_3$, $TiO_2$, $B_2O_3$, $GeO_2$, MgO, $Ta_2O_5$, CoO, $Co_3O_4$, FeO, $Fe_2O_3$ and $Fe_3O_4$.

4. The assisted magnetic recording medium according to claim 1, wherein the layer thickness of the pinning layer is from 0.5 nm to 5 nm.

5. The assisted magnetic recording medium according to claim 1, which has the pinning layer on the side of the magnetic layer opposite from the substrate side.

6. A magnetic storage device comprising an assisted magnetic recording medium according to claim 1, a magnetic recording medium driving unit for rotating the assisted magnetic recording medium, a magnetic head that carries out recording and reproduction operations on the assisted magnetic recording medium, a magnetic head driving unit for moving the magnetic head, and a recording/reproduction signal processing system.

\* \* \* \* \*